(12) United States Patent  
Patil et al.

(10) Patent No.: US 9,413,560 B2  
(45) Date of Patent: Aug. 9, 2016

(54) DIFFERENTIATED QUALITY OF SERVICE USING SECURITY AS A SERVICE

(71) Applicant: Cisco Technology, Inc., San Jose, CA (US)

(72) Inventors: Prashanth Patil, Bangalore (IN); Tirumaleswar Reddy, Bangalore (IN); Daniel Wing, San Jose, CA (US); William Ver Steeg, Atlanta, GA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 155 days.

(21) Appl. No.: 14/278,598

(22) Filed: May 15, 2014

(65) Prior Publication Data

US 2015/0334029 A1 Nov. 19, 2015

(51) Int. Cl.
| | |
|---|---|
| *H04L 12/851* | (2013.01) |
| *H04L 12/24* | (2006.01) |
| *H04L 29/06* | (2006.01) |
| *H04L 12/64* | (2006.01) |
| *H04L 29/08* | (2006.01) |

(52) U.S. Cl.
CPC ............ *H04L 12/6418* (2013.01); *H04L 29/06* (2013.01); *H04L 41/5019* (2013.01); *H04L 41/5038* (2013.01); *H04L 47/2441* (2013.01); *H04L 63/145* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 2008/0250491 | A1* | 10/2008 | Choi | H04L 63/029 726/13 |
| 2011/0280143 | A1* | 11/2011 | Li | H04L 12/14 370/252 |
| 2013/0322242 | A1* | 12/2013 | Swenson | H04L 47/11 370/232 |
| 2014/0032785 | A1* | 1/2014 | Chaudhuri | G06F 9/5027 709/245 |
| 2014/0297491 | A1* | 10/2014 | Cao | G06Q 20/145 705/34 |
| 2014/0341199 | A1* | 11/2014 | Jeon | H04L 67/2842 370/338 |
| 2015/0026313 | A1* | 1/2015 | Chawla | H04L 47/24 709/220 |
| 2015/0286935 | A1* | 10/2015 | Mukherjee | H04L 47/70 706/46 |
| 2015/0304234 | A1* | 10/2015 | Salle | G06F 7/00 709/226 |

OTHER PUBLICATIONS

Wing, D. et al., "PCP Flowdata Option." PCP Working Group, Jul. 3, 2013. <http://tools.ietf.org/html/draft-wing-pcp-flowdata-00>.
Penno, R. et al., "Application Enabled SDN (A-SDN)." Network Working Group, Sep. 29, 2013. <http://tools.ietf.org/html/draft-penno-pxp-asdn-00>.

* cited by examiner

*Primary Examiner* — Chi H Pham
*Assistant Examiner* — Soon-Dong D Hyun
(74) *Attorney, Agent, or Firm* — Polsinelli PC (57) ABSTRACT

Various embodiments are disclosed for prioritizing network flows and providing differentiated quality of service in a telecommunications network. In some embodiments, a SecaaS can be utilized to signal flow characteristics of one or more network flows to a connector in a network so that the network can install differentiated quality of service against the one or more network flows based upon the received flow characteristics. Some embodiments enable a connector in a network to act as a PCP client to signal received flow characteristics to an upstream PCP server hosted by an adjacent access network.

20 Claims, 7 Drawing Sheets

DIFFERENTIATED QUALITY OF SERVICE USING SECURITY AS A SERVICE

TECHNICAL FIELD

The present disclosure relates generally to system and method of providing quality of service in a telecommunications network.

BACKGROUND

There is a finite amount of fiber infrastructure to support telecommunications networks. With more devices being added to the networks, whether connected wired or wirelessly, slower applications run within the networks. As a result, the telecommunications networks (e.g., access networks) often don't have sufficient bandwidth or other characteristics to allow some applications to function as desired. Also, access networks that handle network flows may not always be equipped to identify different types of network flows in the networks. Thus, the quality of service in wireless and wired access networks is often constrained.

Therefore, it's a challenge to provide quality of service that warrants differentiated treatments for network flows in an access network.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Systems and methods in accordance with various embodiments of the present disclosure provide a solution to the above-mentioned problems by prioritizing network flows and providing differentiated quality of service accordingly. In particular, various embodiments of the present disclosure provide methods to signal flow characteristics of one or more network flows from a Security as a Service (SecaaS) to a cloud connector so that a network hosting the cloud connector can provide differentiated quality of service based upon the flow characteristics of one or more network flows. In some embodiments, a SecaaS can be utilized to signal flow characteristics of one or more network flows to a connector in a network so that the network can install differentiated quality of service against the one or more network flows based upon the received flow characteristics. Some embodiments enable a connector in a network to act as a PCP client to signal received flow characteristics to an upstream PCP server hosted by an adjacent access network.

In some embodiments, a cloud connector (e.g., ScanSafe connector) that is hosted on the Enterprise network premises redirects network traffic (e.g., HTTP(s)/FTP/SMTP) to the SecaaS for inspection. The SecaaS can perform inspection (e.g., application and protocol detection, deep packet inspection (DPI), or heuristics) to detect malware, exploit scripts, or detect data leakage of the one or more network flows. The network flow is a 5-tuple identified by source IP address, destination IP address, protocol number, source port number, and destination port number. The flow characteristics may include, upstream and downstream bandwidth, jitter, delay, loss, or class of service. In some embodiments, a SecaaS is configured to identify one or more specific types of network flows, such as long-lived network flows (e.g., a streaming video) that have specific flow characteristics. Some embodiments enable the cloud connector to act as a PCP client to signal received flow characteristics of one or more network flows to an upstream PCP server hosted by an Internet service provider (ISP).

In some embodiments, services provided by a SecaaS include, but are not limited to, authentication, anti-virus, anti-malware/spyware, intrusion detection, and security event management. The services can be provided to users either as a service on demand, through a subscription, in a "pay-as-you-go" model, or at no charge.

In some embodiments, if specific flow characteristics are identified, a SecaaS signals the flow characteristics of identified network flows to a connector so that a network hosting the connector can provide differentiated quality of service to the identified network flows. For network flows with other types of flow characteristics, the SecaaS may refrain from signaling to the connector so that the connector is not overwhelmed with flow characteristics of the other types of network flows (e.g., short-lived network flows).

Figure 1A:
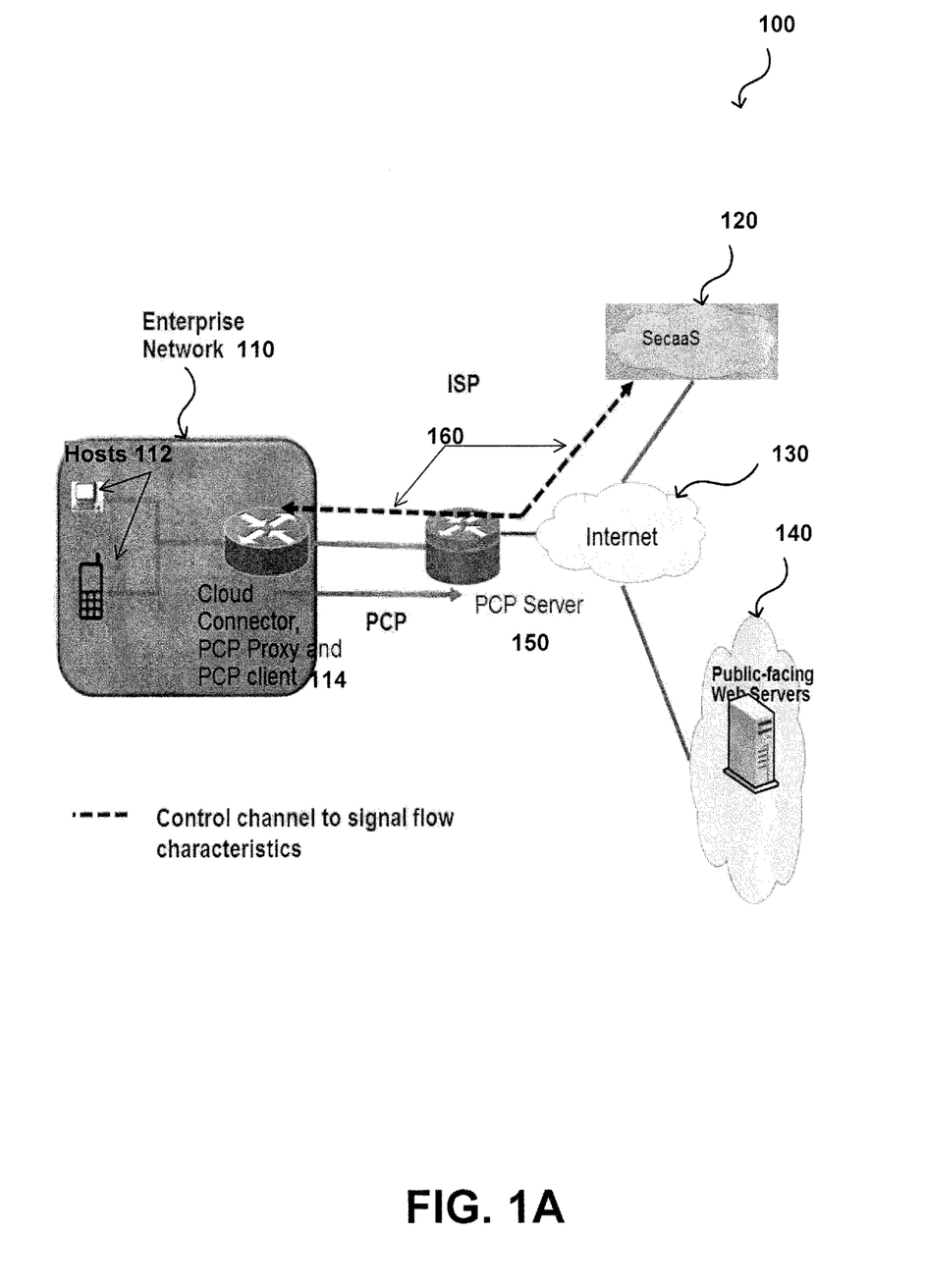
FIGS. 1A and 1B illustrate an example system for providing differentiated quality of services in a telecommunications network in accordance with various embodiments.

FIG. 1A illustrates an example system 100 for providing differentiated quality of services in a telecommunications network in accordance with various embodiments. In this example, the system 100 comprises an enterprise network 110, which includes a cloud connector 114. The cloud connector 114 is coupled to hosts 112 in the enterprise network 110. Although only a cell phone and a computer are shown in FIG. 1A, various types of electronic or computing devices that are capable of sending a request or receiving content may be used. These client devices can include, for example desktop PCs, laptop computers, tablet computers, personal data assistants (PDAs), smart phones, portable media file players, e-book readers, portable computers, head-mounted displays, interactive kiosks, mobile phones, net books, single-board computers (SBCs), embedded computer systems, wearable computers (e.g., watches or glasses), gaming consoles, home-theater PCs (HTPCs), TVs, DVD players, digital cable boxes, digital video recorders (DVRs), computer systems capable of running a web-browser, or a combination of any two or more of these. The computing device may use operating systems that include, but are not limited to, Android, Berkeley Software Distribution (BSD), iPhone OS (iOS), Linus, OS X, Unix-like Real-time Operating System (e.g., QNX), Microsoft Windows, Window Phone, and IBM z/OS.

The cloud connector 114 is coupled to a SecaaS 120 via the Internet 130. The SecaaS 120 is configured to detect malware, detect data leakage, and/or exploit scripts by performing application and protocol detection, DPI, or heuristics. Depending on the desired implementation in the system 100, a variety of networking and messaging protocols may be used, including but not limited to TCP/IP, open systems interconnection (OSI), file transfer protocol (FTP), universal plug and play (UpnP), network file system (NFS), common internet file system (CIFS) ,AppleTalk etc. As would be appreciated by those skilled in the art, the system 100 illustrated in FIG. 1A is used for purposes of explanation, a network system may be implemented with many variations, as appropriate, in the configuration of the cloud connector and client devices in accordance with various embodiments of the present disclosure.

In this example, a host 112 makes a request to the Public-facing Web Servers 140. The cloud connector 114 receives and redirects the request to the SecaaS 120 for inspection. The SecaaS 120 inspects and then forwards the request to the Public-facing Web Servers 140. Upon receiving content from the Public-facing Web Servers 140, the SecaaS 120 inspects the content and determines whether a particular network flow associated with the content is of genuine interest and has specific flow characteristics. In response to a determination that the particular network flow warrants signaling, the SecaaS 120 sends flow characteristics of the particular network flow to the cloud connector 114 over an independent control channel 160. The cloud connector 114 is configured to install appropriate quality of service rules against the particular network flow, based at least in part upon the received flow characteristics.

In some embodiments, the connector 114 may function as a PCP Proxy to facilitate communication between a PCP client 110 and upstream PCP server(s) 150 hosted by an ISP policy application. The PCP Proxy may act as a PCP server receiving PCP requests on internal interfaces, and as a PCP client forward accepted PCP requests on an external interface to a PCP server. The PCP Proxy relays PCP requests received from the PCP clients 110 to one or more upstream PCP servers 150. The PCP Proxy may help to establish successful PCP communications for the PCP clients 110, which cannot be configured with the address of a PCP server, located more than one hop away. In this example, the connector 114 signals the flow characteristics of the particular network flow to the PCP Server 150. In response to the PCP request from the PCP Client 114, the PCP Server 150 sends PCP responses to the PCP client.

In some instances, the address of the PCP proxy 114 is provisioned to internal hosts 112 as the default PCP server. If the PCP DHCP (Dynamic Host Configuration Protocol) option is supported by an internal PCP client, the PCP server IP address can be retrieved from local DHCP server. If the PCP DHCP option is not supported, internal PCP clients can assume their default router as being the PCP server.

In some embodiments, the connector/PCP Proxy and PCP Client 114 may handle multiple PCP Servers 150 and/or multiple SecaaS 120 at the same time. Each PCP server or SecaaS is associated with a unique Epoch value. The hosts 112 do not need to be aware of the presence of the multiple PCP Servers 150 and/or multiple SecaaS 120. In some embodiments, the connector/PCP Proxy and PCP Client 114 may load-balance the hosts 112 among available PCP servers 150 and/or SecaaS 120. The connector/PCP Proxy and PCP Client 114 may forward and/or redirect requests from a particular client to an assigned PCP server and/or SecaaS.

Figure 1B:
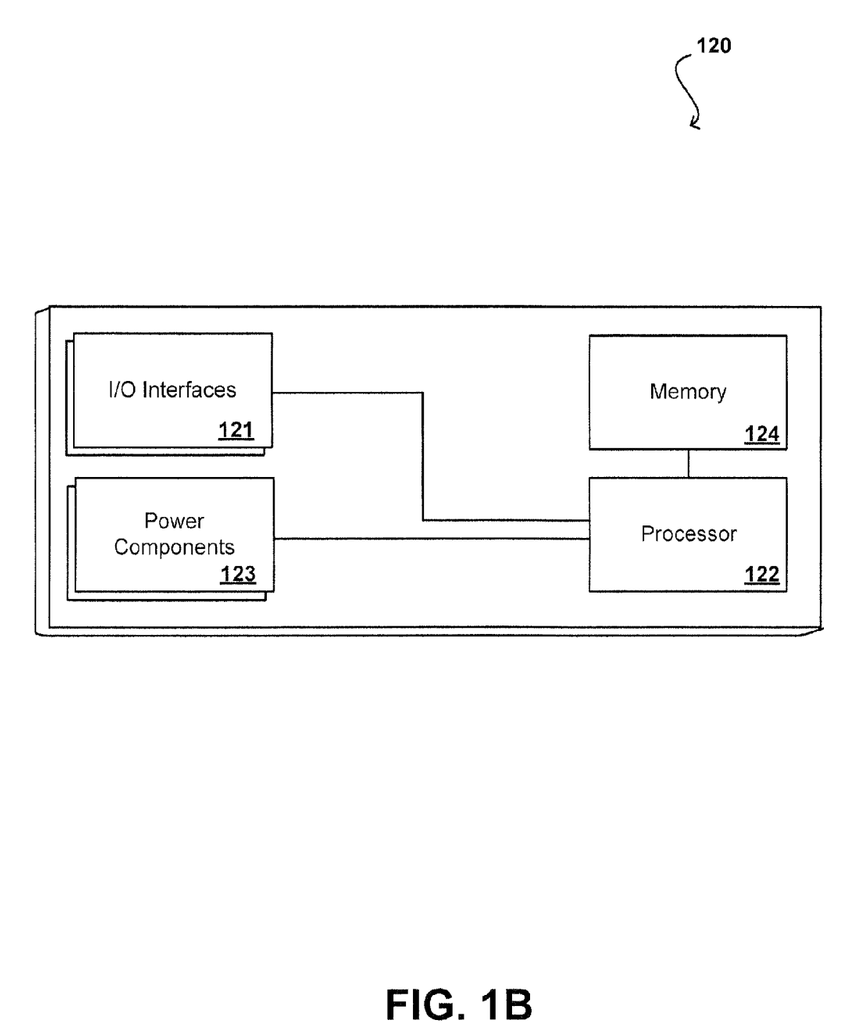

As illustrated in FIG. 1B, the SecaaS 120 may include at least one central processing unit (CPU) 122 for executing instructions that can be stored in a memory device, such as element 124. As would be apparent to one of ordinary skill in the art, the SecaaS 120 can include many types of memory, data storage, or computer-readable media, such as a data storage for program instructions for execution by the at least one CPU 122 and/or being used for storing data, a removable memory available for sharing information with other devices, and any number of computing approaches available for sharing with other server computers.

The example SecaaS 120 might also include one or more wireless components operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections, as known in the art.

The example SecaaS 120 also includes power components 123, such as conventional plug-in approaches, a battery operable to be recharged through conventional plug-in approaches, or through other approaches such as wireless (e.g., capacitive or inductive) charging through proximity with a power mat or other such device. Various other elements and/or combinations are possible as well within the scope of various embodiments.

Figure 2:
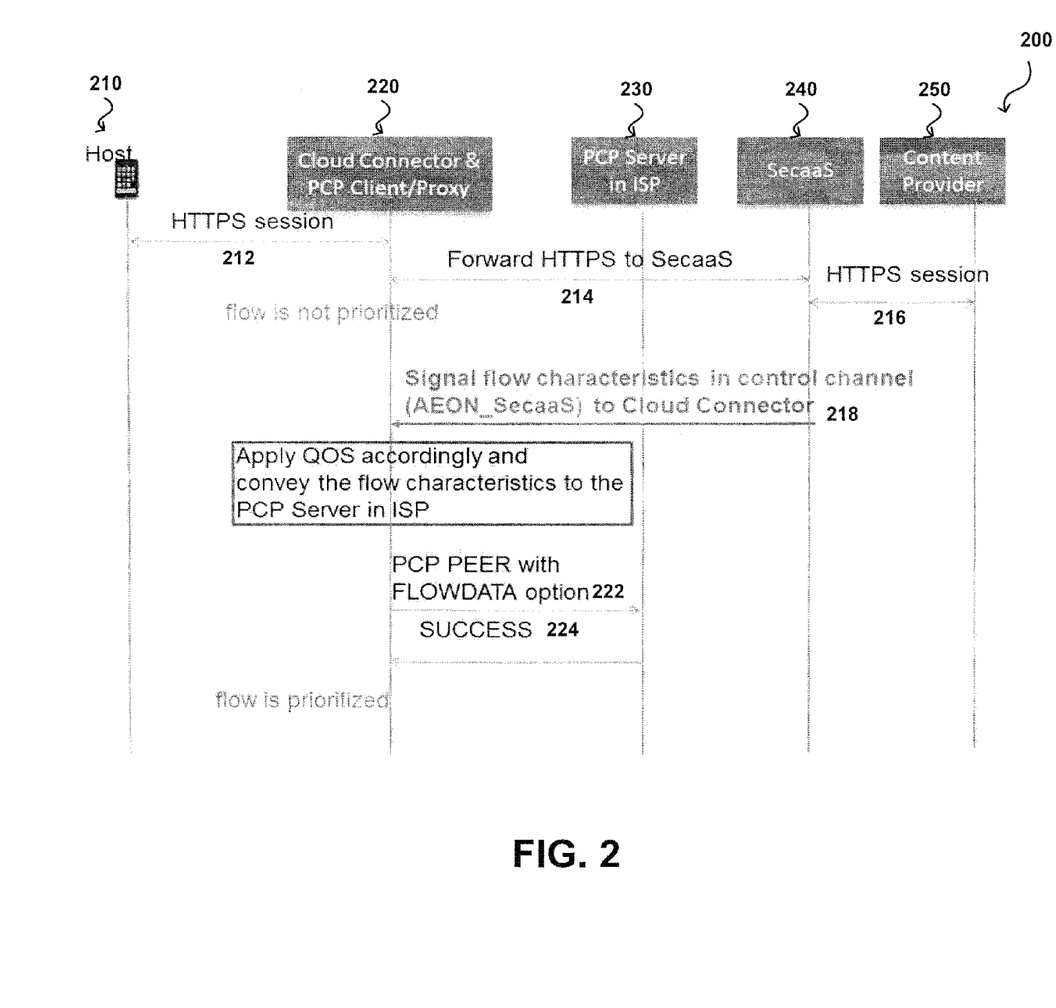
FIG. 2 illustrates an example of a work flow for the system in FIG. 1A in accordance with various embodiments.

FIG. 2 illustrates an example of a work flow 200 for the sample system in FIG. 1A in accordance with various embodiments. In this example, a Host 210 sends 212 a HTTP request to a Cloud Connector and PCP Client/Proxy 220. The Cloud Connector and PCP Client/Proxy 220 forwards 214 the HTTP request to a SecaaS 240. The SecaaS 240 inspects the request and forwards 216 the request to a Content Provider 250. In response to receiving content from the Content Provider 250, the SecaaS 240 inspects the content and determines whether this particular network flow warrants signaling of flow characteristics to the Cloud Connector and PCP Client/Proxy 220. If the answer is yes, the SecaaS 240 signals 218 flow characteristics of the particular network flow to the Cloud Connector and PCP Client/Proxy 220. Based upon the received flow characteristics, the Cloud Connector and PCP Client/Proxy 220 can install suitable quality of service rules against the particular network flow. In some embodiments, the PCP Client 220 may signal 222 the received flow characteristics to an upstream PCP server 230 by using a PCP FLOWDATA option. The PCP server 230 responds 224 to the PCP Client 220 that the flow is partially or fully accommodated.

Figure 3:
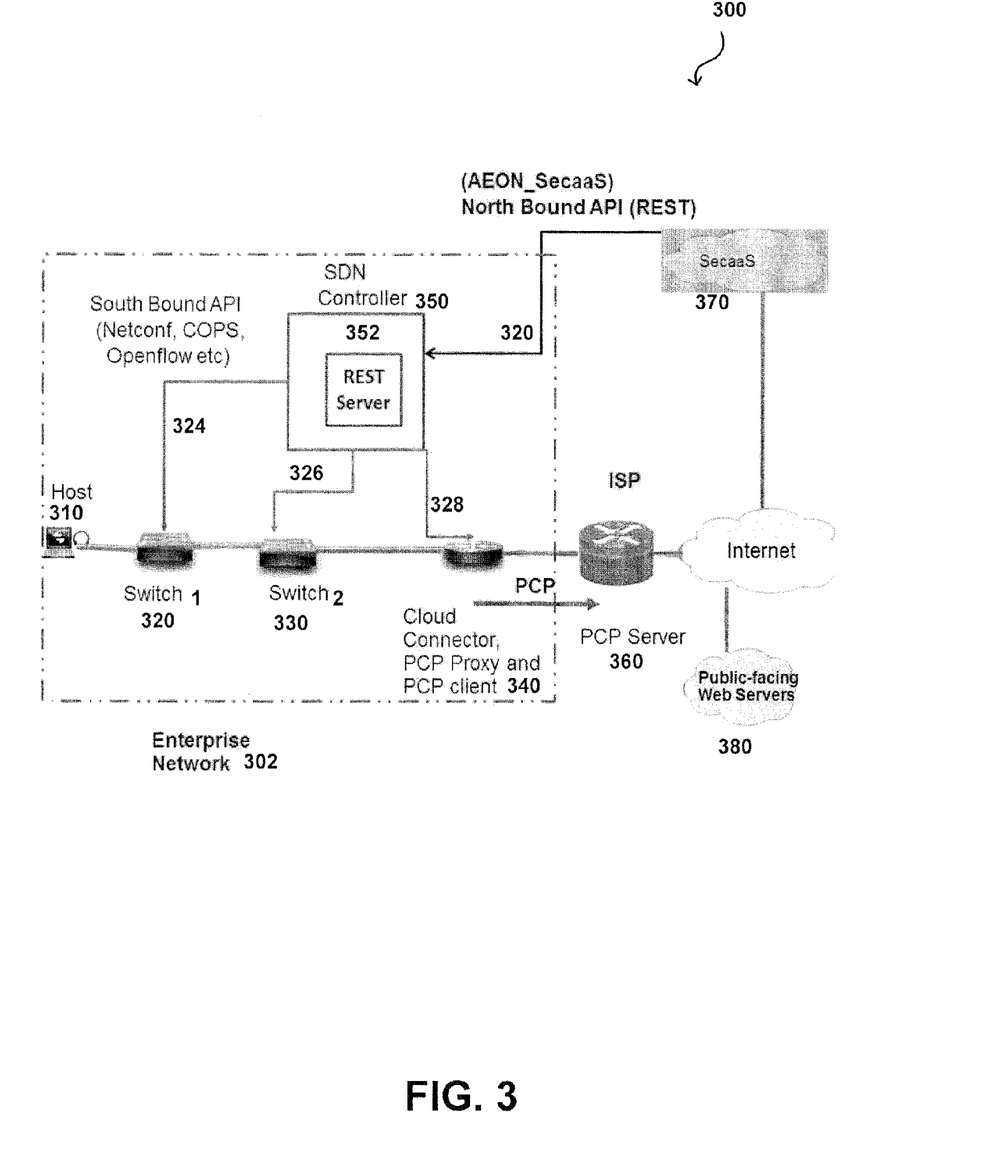
FIG. 3 illustrates another example system for providing differentiated quality of services in a telecommunications network in accordance with various embodiments.

FIG. 3 illustrates another example system 300 for providing differentiated quality of services in a telecommunications network in accordance with various embodiments. In this example, the example system 300 comprises an enterprise network 302, which includes a host 310, a cloud connector/PCP Proxy and PCP Client 340, a switch1 320, a switch2 330, and a software-defined networking (SDN) controller 350. In this paper, a SDN can be a programmable network approach that supports the separation of controlling and forwarding planes in a network via standardized interfaces. An application can be a piece of software that utilizes underlying services to perform a function. The SDN can be based on the concept of separation between a controlled entity and a controller entity. The controller can manipulate the controlled entity with the necessary application programming interfaces (APIs). The interfaces, when local, can be mostly API calls through some library or system call. In many instances, such interfaces can be extended via local inter-process communication (IPC), a protocol that could also act remotely, an open standard protocol, or any suitable protocol. Application operation can be parameterized, for example by passing certain arguments at call time, but it is meant to be a standalone piece of software: an application does not offer any interfaces to other applications or services. A service can be a piece of software that performs one or more functions and provides one or more APIs to applications or other services of the same or different layers to make use of the functions and returns one or more results. Services can be combined with other services, or called in a certain serialized manner, to create a new service.

In this example, the cloud connector/PCP Proxy and PCP Client 340 can convey the IP addresses or FQDN (fully qualified domain name) of the SDN controller 350 to a SecaaS 370. In some embodiments, the cloud connector/PCP Proxy and PCP Client 340 also punches holes in its firewall to permit traffic from the SecaaS 370 to the SDN controller 350. An application on the host 310 can make an HTTP(S)/FTP request to a public-facing web server 380. The cloud connector/PCP Proxy and PCP Client 340 receives and redirects the request to the SecaaS 370 for inspection. The SecaaS 370 receives content from the public-facing web server 380 and inspects the content to determine whether this particular network flow is of genuine interest and warrants signaling of flow characteristics to the SDN controller 350 using Northbound APIs (e.g., REST (representational state transfer) API, public API, management API, or northbound interfaces for different classes of applications, from lightweight OpenFlow "drivers", all the way to fully-baked application-server platforms with advanced controller logic, state synchronization, or high-availability). The SDN controller 350 is configured to install appropriate quality of service rules against the particular network flow through on-path network devices (e.g., at least one of the switch1 320, the switch2 330, and the cloud connector/PCP Proxy, or PCP Client 340) by using southbound APIs (e.g., Common Open Policy Service usage for Policy Provisioning (COPS-PR), Network Configuration Protocol (Netconf), or Openflow), based upon the received flow characteristics.

In some embodiments, the network 302 further convey the received flow characteristics to one or more adjacent access networks using a PCP FLOWDATA option. In some instances, the cloud connector/PCP Proxy, or PCP Client 340 may function as a PCP Proxy to facilitate communication between the host 310 and an upstream PCP server(s) 360 hosted by the ISP.

Figure 4:
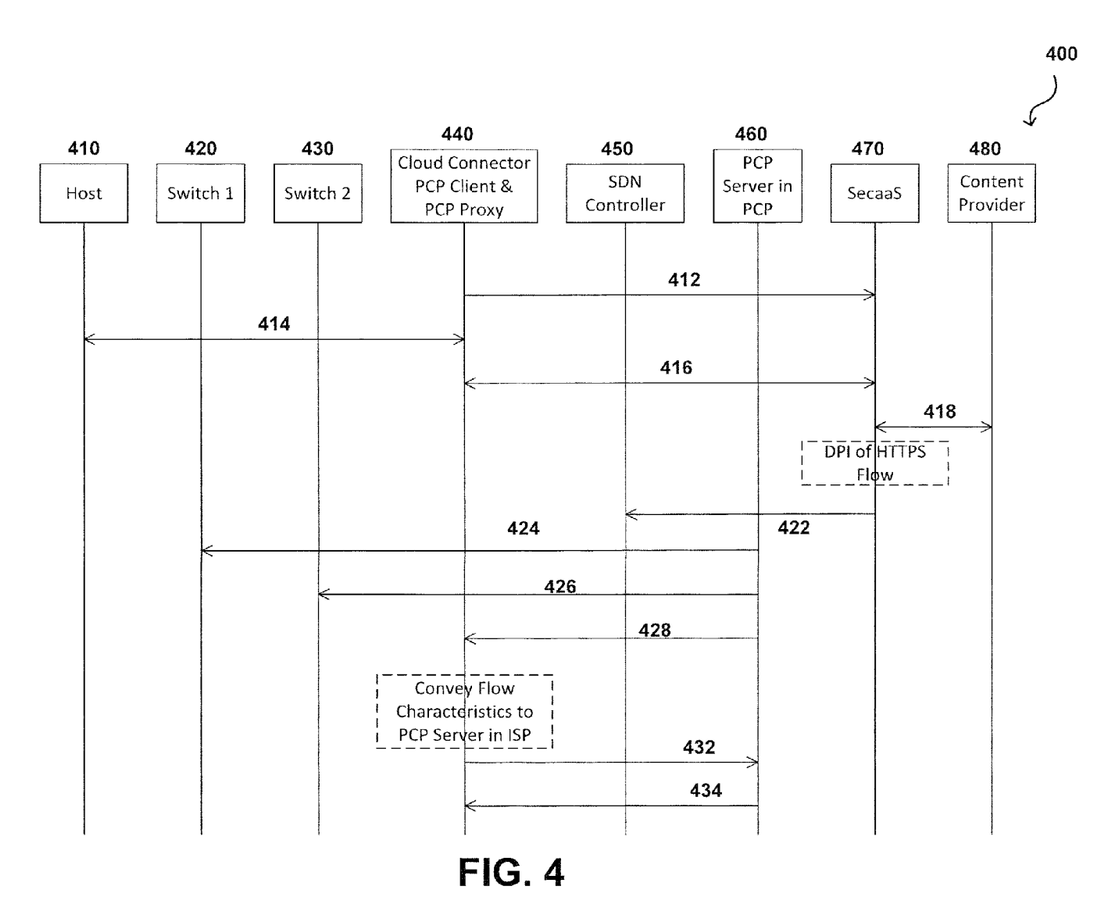
FIG. 4 illustrates an example of a work flow for the system in FIG. 3 in accordance with various embodiments.

FIG. 4 illustrates an example of a work flow 400 for the sample system in FIG. 3 in accordance with various embodiments. In this example, a cloud connector 440 signals 412 IP addresses or FQDN of a SDN controller 450 to a SecaaS 470. The cloud connector 440 with PCP client features may also create holes in the firewall to permit traffic from the SecaaS 470 to the SDN controller 450. A host 410 makes 414 an HTTP(S)/FTP request to a content provider 480. The cloud connector 440 redirects 416 the HTTP(S)/FTP request to the SecaaS 470. The SecaaS 470 receives 416 and inspects the HTTP(S)/FTP request before forwards 418 the HTTP(S)/FTP request to the content provider 480.

Upon receiving 418 the content from the content provider 480, the SecaaS 470 inspects the content before sending it back to the host 410. The SecaaS 470 determines whether this particular network flow of the content is of genuine interest and warrants signaling of flow characteristics to the SDN controller 450 using REST, Extensible Messaging and Presence Protocol (XMPP), or other suitable protocols. If the determination is yes, the SecaaS 470 signals 422 flow characteristics of this particular network flow to the SDN controller 450. In response to receiving the flow characteristics, the SDN controller 450 can program the local network that the controller 450 is located at to apply 424/426/428 quality of service policies to prioritize the particular network flow, based upon the flow characteristics and the associated metadata.

In some embodiments, the cloud connector 440 with PCP client features may signal 432 the received flow characteristics to an upstream PCP server 460 by using a PCP FLOWDATA option. The PCP server 460 responds 434 to the cloud connector 440 with PCP client features that the flow can partially or fully accommodated by one or more adjacent access networks.

Figure 5:
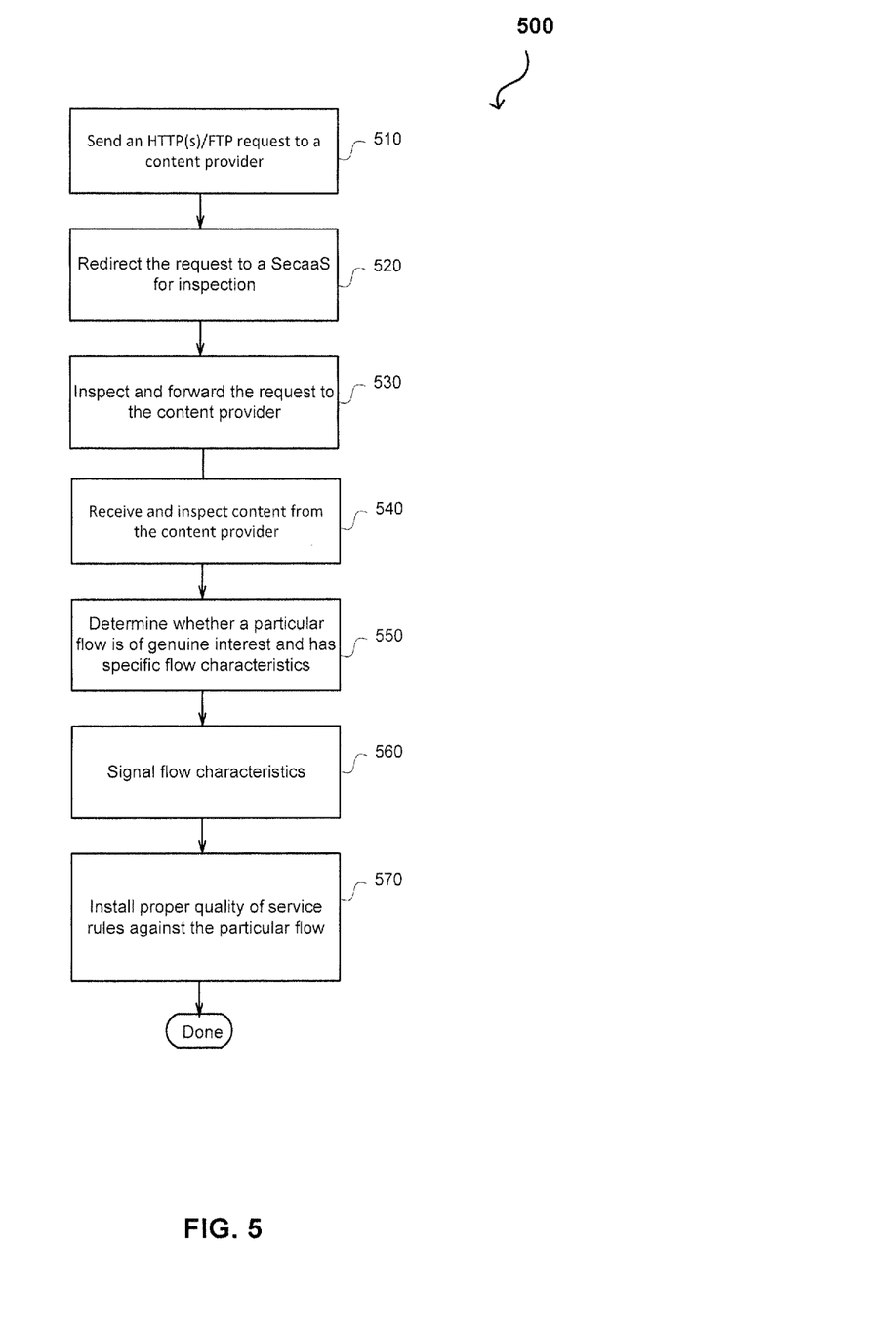
FIG. 5 illustrates an example process of providing quality of service in accordance with various embodiments.

FIG. 5 illustrates an example process 500 of providing quality of service in accordance with various embodiments. It should be understood that there can be additional, fewer, or alternative steps performed in similar or alternative orders, or in parallel, within the scope of the various embodiments unless otherwise stated. The example method embodiment 500 starts with sending an HTTP(s)/FTP request from an endpoint to a content provider, at step 510. The HTTP(s)/FTP request is redirected to a SecaaS for inspection, at step 520. The SecaaS may be located in the same network as that of the endpoint or in the cloud. The services provided by the SecaaS may include, but are not limited to, authentication, anti-virus, anti-malware/spyware, intrusion detection, security event management, or other suitable services. The SecaaS inspects and forwards the HTTP(s)/FTP request to the content provider, at step 530. In response to receiving content from the Content Provider, the SecaaS inspects the content, at step 540. The SecaaS further determines whether this particular network flow of the content is of genuine interest and has specific flow characteristics, at step 550.

If the particular network flow has the specific flow characteristics, then the SecaaS signals the flow characteristic to the network of the endpoint, at step 560. Based at least in part upon the flow characteristics, suitable quality of service rules can be installed against the particular network flow, at step 570. In some embodiments, the received flow characteristics may be further signaled to an upstream PCP server by using a PCP FLOWDATA option. The PCP server in the response conveys if the flow is fully or partially accommodated.

Figure 6:
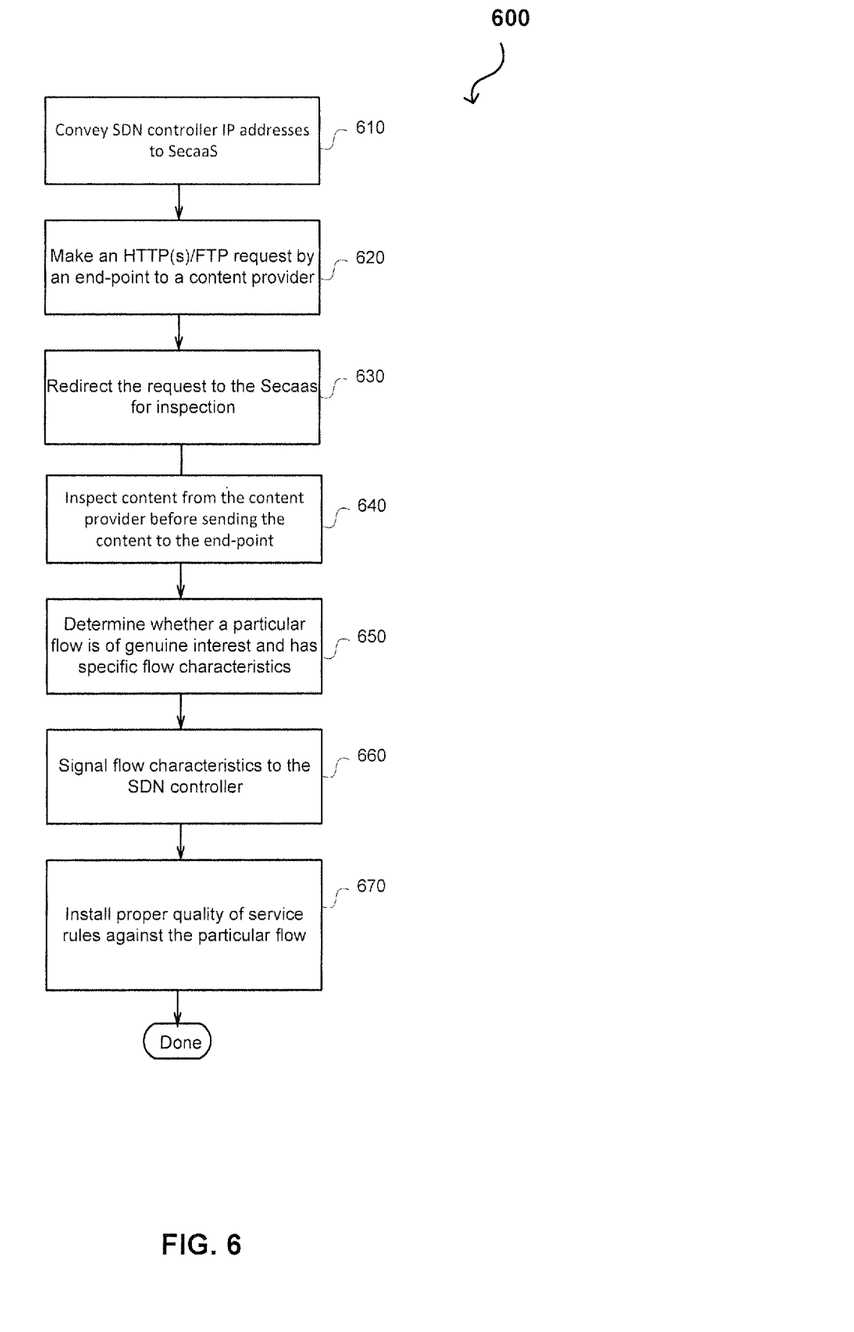
FIG. 6 illustrates another example process of providing quality of service in accordance with various embodiments.

FIG. 6 illustrates another example process 600 of providing quality of service in accordance with various embodiments. It should be understood that there can be additional, fewer, or alternative steps performed in similar or alternative orders, or in parallel, within the scope of the various embodiments unless otherwise stated. The example method embodiment 600 starts with conveying an IP address or FQDN of a SDN controller in a network to a SecaaS, at step 610. In some embodiments, one or more holes in the firewall of the network may be created to permit traffic from the SecaaS to the SDN controller. An endpoint in the network makes an HTTP(S)/FTP request to a content provider, at step 620. The HTTP(S)/FTP request is redirected to the SecaaS for inspection, at step 630. The SecaaS receives and inspects the HTTP(S)/FTP request before forwards the HTTP(S)/FTP request to the content provider. In response to receiving the content from the content provider, the SecaaS inspects the content before sending it back to the endpoint, at step 640.

The SecaaS determines whether this particular network flow of the content is of genuine interest and has specific flow characteristics, at step 650. Upon a determination that the particular network flow has one or more of the specific flow characteristics, the SecaaS signals the flow characteristics of this particular network flow to the SDN controller, at step 660, by using at least one of REST, Extensible Messaging and Presence Protocol (XMPP), or other suitable protocols. The SDN controller can install suitable quality of service policies to prioritize the particular network flow, based upon the flow characteristics and the associated metadata, at step 670.

In some embodiments, the network may signal the received flow characteristics to an upstream PCP server by using a PCP FLOWDATA option. The PCP server in the response conveys if the flow is fully or partially accommodated.

Various embodiments of the present disclosure provide methods for prioritizing network flows and providing differentiated quality of service. While specific examples have been cited above showing how the optional operation may be employed in different instructions, other embodiments may incorporate the optional operation into different instructions. For clarity of explanation, in some instances the present disclosure may be presented as including individual functional blocks including functional blocks comprising devices, device components, steps or routines in a method embodied in software, or combinations of hardware and software.

The various embodiments can be further implemented in a wide variety of operating environments, which in some cases can include one or more server computers, user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

To the extent embodiments, or portions thereof, are implemented in hardware, the present invention may be implemented with any or a combination of the following technologies: a discrete logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Most embodiments utilize at least one network that would be familiar to those skilled in the art for supporting communications using any of a variety of commercially-available protocols, such as TCP/IP, OSI, FTP, UPnP, NFS, CIFS, AppleTalk etc. The network can be, for example, a local area network, a wide-area network, a virtual private network, the Internet, an intranet, an extranet, a public switched telephone network, an infrared network, a wireless network and any combination thereof.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include server computers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from open market.

The server farm can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared computing device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and computing media, such as but not limited to volatile and nonvolatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
communicating an Internet Protocol (IP) address or Fully Qualified Domain Name (FQDN) of a Software-defined Networking (SDN) controller in a local network to a Security as a Service (SecaaS);
sending an Hypertext Transfer Protocol (HTTP) or File Transfer Protocol (FTP) request to a content provider;
redirecting the HTTP or FTP request to the SecaaS for inspection;
receiving content from the content provider, the content redirected from the SecaaS;
receiving, from the SecaaS, flow characteristics of a particular network flow associated with the content;
installing, by the SDN controller, a quality of service rule against the particular network flow on one or more on-path devices in the local network based at least in part upon the flow characteristics; and
conveying from a cloud connector the received flow characteristics to one or more adjacent networks using a port control protocol (PCP) FLOWDATA option.

2. The computer-implemented method of claim 1, wherein the SDN controller supports the separation of controlling and forwarding planes in the local network via standardized interfaces.

3. The computer-implemented method of claim 2, further comprising:
inspecting, by the SecaaS, the content to determine whether the particular network flow has specific flow characteristics; and
in response to a determination that the particular network flow has one or more of the specific flow characteristics of interest, signaling the flow characteristics of the particular network flow from the SecaaS to the SDN controller using one or more northbound application programming interfaces (APIs).

4. The computer-implemented method of claim 3, wherein the one or more northbound APIs include one or more APIs from a group comprising: a REST API, public API, management API, or one or more northbound interfaces for different classes of applications including lightweight OpenFlow "drivers", fully-baked application-server platforms with advanced controller logic, state synchronization, or high-availability.

5. The computer-implemented method of claim 1, further comprising:
generating one or more holes in a firewall of the local network to enable traffic from the SecaaS to the SDN controller.

6. The computer-implemented method of claim 1, wherein the SDN controller is configured to install the quality of service rules against the particular network flow using southbound APIs based at least upon the received flow characteristics.

7. The computer-implemented method of claim 6, wherein the southbound APIs include at least one of Common Open Policy Service usage for Policy Provisioning (COPS-PR), Network Configuration Protocol (Netconf), or Openflow.

8. The computer-implemented method of claim 6, wherein the one or more on-path devices include the cloud connector.

9. The computer-implemented method of claim 1, further comprising:
signaling the received flow characteristics from the cloud connector to an upstream port control protocol (PCP) server by using the PCP FLOWDATA option; and
receiving one or more responses from the PCP server to enable the particular network flow to be prioritized in both the local network and one or more adjacent access networks that are coupled to the local network.

10. The computer-implemented method of claim 1, wherein the SecaaS is configured to perform application and protocol detection, perform deep packet inspection (DPI), or heuristics to detect malware, exploit scripts, or detect data leakage of one or more network flows in the network.

11. The computer-implemented method of claim 1, wherein the flow characteristics include, source and destination addresses, L4 protocol, application layer port information, upstream and downstream bandwidth, jitter, delay, loss, or class of service.

12. A computer-implemented method, comprising:
sending an Hypertext Transfer Protocol (HTTP) or File Transfer Protocol (FTP) request to a content provider;
redirecting, by a connector in a local network, the HTTP or FTP request to a Security as a Service (SecaaS) for inspection;
receiving, from the SecaaS, flow characteristics of a particular network flow associated with the content;
receiving content from the content provider, the content redirected from the SecaaS;
installing a quality of service rule against the particular network flow in the local network based at least in part upon the flow characteristics; and
conveying, from the connector, the received flow characteristics to one or more adjacent networks using a port control protocol (PCP) FLOWDATA option.

13. The computer-implemented method of claim 12, further comprising:
inspecting, by the SecaaS, the content to determine whether the particular network flow has specific flow characteristics of interest; and
in response to a determination that the particular network flow has one or more of the specific flow characteristics, signaling the flow characteristics of the particular network flow from the SecaaS to the connector using one or more northbound application programming interfaces (APIs).

14. The computer-implemented method of claim 12, further comprising:

signaling the received flow characteristics from the connector to an upstream PCP server by using the PCP FLOWDATA option; and receiving one or more responses from the PCP server to enable the local network to prioritize the particular network flow in both the local network and one or more adjacent access networks that are coupled to the local network.

15. The computer-implemented method of claim 12, wherein the SecaaS is configured to perform application and protocol detection, perform deep packet inspection (DPI), or heuristics to detect malware, exploit scripts, or detect data leakage of one or more network flows in the particular network.

16. The computer-implemented method of claim 12, wherein the flow characteristics include, source and destination addresses, L4 protocol, application layer port information, upstream and downstream bandwidth, jitter, delay, loss, or class of service.

17. A system, comprising:
at least one processor; and
memory including instructions that, when executed by the at least one processor, cause the system to:
communicate an IP address or Fully Qualified Domain Name (FQDN) of a Software-defined Networking (SDN) controller in a local network to a Security as a Service (SecaaS);
send an Hypertext Transfer Protocol (HTTP) or File Transfer Protocol (FTP) request to a content provider;
redirect the HTTP or FTP request to the SecaaS for inspection;
receive content from the content provider, the content redirected from the SecaaS;
receive, from the SecaaS, flow characteristics of a particular network flow associated with the content;
install, by the SDN controller, a quality of service rule against the particular network flow on one or more on-path devices in the network based at least in part upon the flow characteristics, wherein the one or more on-path devices include a connector;
signal the received flow characteristics from the connector to an upstream port control protocol (PCP) server by using a PCP FLOWDATA option; and
receive one or more responses from the PCP server to enable the particular network flow to be prioritized in both the local network and one or more adjacent access networks that are coupled to the local network.

18. The system of claim 17, wherein the instructions when executed further cause the system to:
generate one or more holes in a firewall of the network to enable traffic from the SecaaS to the SDN controller.

19. The system of claim 18, wherein the instructions when executed further cause the system to:
inspect, by the SecaaS, the content to determine whether the particular network flow has specific flow characteristics; and
in response to a determination that the particular network flow has one or more of the specific flow characteristics, signaling the flow characteristics of the particular network flow from the SecaaS to the SDN controller using one or more northbound APIs.

20. The system of claim 17, wherein the SecaaS is configured to perform application and protocol detection, perform deep packet inspection (DPI), or heuristics to detect malware, exploit scripts, or detect data leakage of one or more network flows in the network.

* * * * *